July 7, 1931. F. W. GILLARD 1,813,491
LUMINOUS ADVERTISEMENT
Filed Aug. 31, 1927

Inventor
Francis Walter Gillard
by Sefton-Jones, O'Dell & Stephens
Attorneys.

Patented July 7, 1931

1,813,491

UNITED STATES PATENT OFFICE

FRANCIS WALTER GILLARD, OF WEST NORWOOD, LONDON, ENGLAND, ASSIGNOR, BY MESNE ASSIGNMENTS, TO VIVIDAD HOLDINGS LIMITED, OF LONDON, ENGLAND, A BRITISH COMPANY

LUMINOUS ADVERTISEMENT

Application filed August 31, 1927, Serial No. 217,024, and in Great Britain September 17, 1926.

This invention is a method of producing luminous advertisements and displays by causing invisible ultra violet radiation to excite fluorescence. The depth of fluorescence may be controlled by using a filter of suitable density, which may serve at the same time to filter off any visible rays produced by the generator of the invisible radiation.

A preferred development of the invention is the production of advertisements or the like in pigments, inks or the like of which the fluorescence under ultra-violet radiation, that is to say electromagnetic waves shorter than waves of visible light, is of substantially the same colour as the advertisements have in visible light. Thus any well-known advertisement in colours, for instance a poster, may be prepared in accordance with this invention, and exhibited under daylight or artificial light and upon daylight fading or the artificial light being extinguished, a beam of ultra-violet light from which all visible rays have been sieved by a suitable screen, may be thrown upon the advertisement causing it to appear self luminous in its ordinary colours with no apparent source of illumination. Instead of as a poster, the advertisement may be prepared in a shop window the ultra-violet rays being thrown onto it from within the window. In this way an illuminated advertisement is obtained in a shop window without any apparent source of light and without interfering with vision through the window.

In an alternative method, the whole surface of the poster or the like may be coated with fluorescent material and a stencil, lantern slide, photographic negative or the like transparency may be interposed in the beam of invisible rays.

In some cases the fluorescent pigments or inks may be painted or applied upon other non-fluorescent colours so that the colour of the advertisement by visible light is partly or mainly due to the non-fluorescent ink or pigment. The fluorescent pigments or inks, whether applied to a plain surface or upon other non-fluorescent colours, may conveniently be applied by a printing process such as lithography.

A convenient source of ultra-violet radiation is the mercury vapour arc lamp. Such a lamp is advantageously made with a tubular body which can be shaped to follow the contour of an article or surface to be displayed, such as a clock or instrument dial, a close fitting plate being provided on the tubular body or the tubular body itself may be made of filtering material. Lamps of this kind may also be used for outlining letters or characters of a large sign. Or they may be shaped in letter or character form and coated on one side with fluorescent pigment and backed up on the other side with a background prepared with pigment fluorescing a different colour. Alternatively a mercury vapour lamp with an envelope of glass, or preferably quartz, which is more transparent to ultra-violet rays, is mounted within an opaque box, suitably ventilated and light trapped, provided with a window fitted with a screen of material which is as transparent as may be to ultra-violet rays, while opaque or substantially so to visible light. By changing the screen the emission of ultra-violet rays, and therewith the degree of fluorescence can be controlled.

The invention may also be applied to decorative purposes. For example the ceiling of a cinematograph theatre may be prepared with the pigments and caused to fluoresce by filtered beams from concealed sources of ultra-violet rays.

Some arrangements for carrying the invention into effect are illustrated by way of example in the accompanying drawings, in which—

Figure 1:
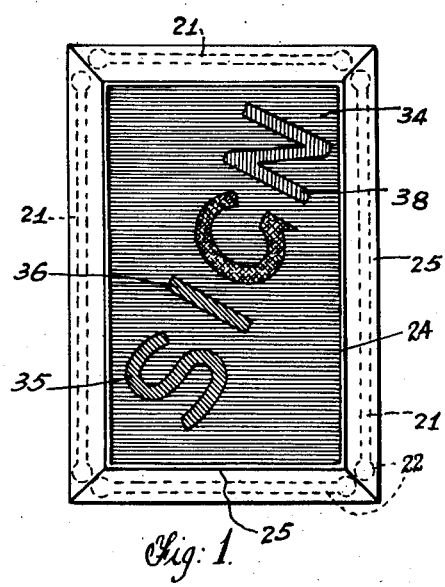
Figure 1 shows in front view a poster or other surface arranged for use according to the invention.
Figure 2:
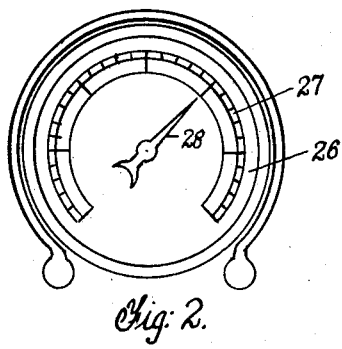
Figure 2 shows a dial arranged to be rendered luminous by the invention.

As shewn in Figure 1 the ultra-violet rays are generated in the tubular part 21 of a Cooper-Hewitt mercury vapour lamp 22. Four such lamps are arranged around the margin of a poster 24, or a surface such as a decorated ceiling prepared with the fluorescent materials, and a reflector 25 which conceals the lamps is provided over each. Figure 2 shows a similar lamp of circular contour arranged round a dial 26, the indications 27 and needle 28 of the dial being treated with the fluorescent materials.

Figure 3:
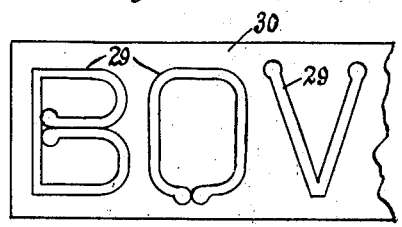
Figure 3 shows a front view of another form of sign.
Figure 4:
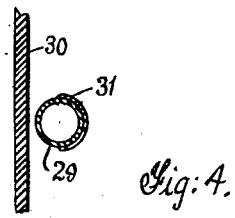
Figure 4 shows a detail sectional view of Figure 3.

In Figures 3 and 4 a sign is made up of a series of tubular lamps 29 each bent to letter form and arranged before a backboard 30. The backboard is treated with a preparation fluorescing in one colour, and the visible front part 31 of the lamp tubes is treated with a compound fluorescing another colour.

Figure 5:
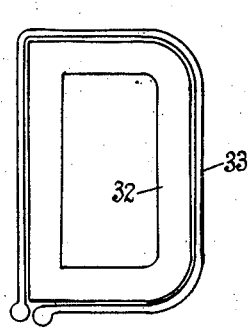
Fig. 5 is an elevation of a single large character for use according to the invention.

In Figure 5 a very large letter such as would be used in a wall sign is shown. Here the letter 32 of any suitable material such as metal or glass is coated with the fluorescent material, and is surrounded by a suitably shaped lamp tube 33, which may be held in place by clips.

In all the above cases the lamp tube is of a material such as nickel oxide glass which forms its own filter. One suitable glass for this purpose has the following composition—

| | Per cent |
|---|---|
| Silica | 50 |
| Potassium oxide | 16 |
| Baryta | 25 |
| Nickle oxide | 9 |

The transparency to ultra-violet rays is controlled by the proportion of nickel oxide but if less than 9% is used too much visible light is transmitted.

In order that the desired effect may be produced pigments or materials giving brilliant fluorescence are required, and preferably they should appear of substantially the same colour by white light as the colour of their fluorescence under the invisible radiation to be employed. Ordinarily a fluorescent substance mixed with a gum or other suitable medium to form a paint or ink thereby loses considerably in the brilliance of its fluorescence. Pigments of the requisite brilliance may however, be produced by combining the fluorescent substance with a carrier or vehicle which is itself fluorescent.

Suitable vehicles for the purpose are for instance, yellow vaseline and white paraffin wax of melting point about 140° F., of which the former gives a blue and the latter a violet fluorescence under ultra-violet radiation. These vehicles may be used singly or in admixture. For example five parts by weight of vaseline and ten to fifteen parts by weight of paraffin wax melted together, or dissolved in 175 parts by weight of benzene, forms a suitable medium in which other fluorescent bodies may be incorporated.

The following are examples of pigments suitable for the purpose of the invention.

For a blue-violet fluorescence 5 parts of vaseline and 12 parts of white paraffin wax of melting point 140° F. are dissolved in 175 parts of benzene, and 5 parts of finely powdered calcium salicylate are stirred in.

Alternatively 5 parts of æsculine may be substituted for the calcium salicylate.

For an apple-green fluorescence 5 parts of anthracene may be substituted in the first composition for the calcium salicylate.

For a brilliant green fluorescence 20 parts of cellulose acetate are dissolved in 300 parts by weight of chloroform and 1 part of vaseline is dissolved in 15 to 37 parts of chloroform and the solutions thoroughly mixed; with the mixed solution are incorporated 10 to 30 parts of finely powdered potassium uranyl sulphate.

For an orange yellow fluorescence, phosphorescent zinc sulphide containing about 1 part in 1000 of manganese may be substituted for the potassium uranyl sulphate in the above formula.

For a red fluorescence 100 parts of zinc sulphide with 20 parts of cadmium sulphate may be incorporated in gum, the consistency depending on the brilliance of hue desired.

For example the poster shown in Figure 1 may have a design prepared in the colours mentioned above each treated with one of the fluorescent preparations described. Thus the background part 34 may be blue violet, the letter S at 35 may be apple green, the letter I at 36 may be brilliant green, the letter G at 37 may be orange yellow and the letter N at 38 may be red, each part of the design being treated with the corresponding preparation.

It will be understood that the proportions named may be varied to adjust the tint and the brilliance of the pigment, and other colours may be produced by combinations of the pigments or by the substitution of other fluorescent substances in the fluorescent vehicles.

When this invention is used for posters or the like exposed to weather or similar conditions the poster is finally treated with a waterproof coating for instance of transparent varnish by any suitable means.

I claim:—

1. In displaying by means of fluorescence excited by invisible ultra-violet rays, a display surface treated with fluorescent paints consisting of fluorescent preparations carried in a fluorescent vehicle.

2. In displaying by means of fluorescence excited by invisible ultra-violet rays, a display surface treated with fluorescent paints consisting of a fluorescent preparation carried in a vehicle including non-liquid petroleum products.

3. In displaying by means of fluorescence excited by invisible ultra-violet rays, a display surface treated with fluorescent paints consisting of a fluorescent preparation carried in a vehicle including non-liquid petroleum products rendered liquid for use.

4. In displaying by means of fluorescence excited by invisible ultra-violet rays, a display surface treated with fluorescent paints consisting of a fluorescent preparation carried in a vehicle consisting of yellow vaseline and paraffin wax dissolved in benzine for use.

5. A method of preparing a display surface for use in natural light and for excitation with an invisible beam of ultra violet light, which consists in preparing a design on the surface in colours visible by ordinary light and covering said design with fluorescent pigments consisting of a fluorescent substance, a fluorescent vehicle comprising a mixture of cellulose acetate and paraffin wax, and a solvent for said vehicle.

6. The combination with means for projecting invisible ultra violet light thereon, of a sign bearing a design visible by ordinary light, certain parts of said design being blue violet in colour, other parts being brilliant green in colour, other parts being orange yellow in colour and other parts being red in colour, said coloured parts of said design being separately covered throughout with pigments fluorescing with the respective colours under the action of said invisible ultra violet light, all said pigment being incorporated in a fluorescent carrier.

7. The combination with means for projecting invisible ultra violet light thereon, of a sign bearing a design visible by ordinary light, certain parts of said design being blue violet in colour, other parts being brilliant green in colour and other parts being orange yellow in colour, said coloured parts of said design being separately covered with fluorescent pigments carried in petroleum products, said fluorescent pigments comprising calcium salicylate on the blue violet parts of the design, potassium uranyl sulphate on the brilliant green parts of the design, and phosphorescent zinc sulphide with a trace of manganese sulphide on the orange yellow parts of the design.

8. The combination with means for projecting invisible ultra violet light thereon, of a sign bearing a design visible by ordinary light, certain parts of said design being brilliant green in colour and other parts being orange yellow in colour, said coloured parts of said design being separately covered with fluorescent pigments carried in a mixed carrier of cellulose acetate and paraffin wax, said fluorescent pigments comprising potassium uranyl sulphate on the brilliant green parts of the design and phosphorescent zinc sulphide with a trace of manganese sulphide on the orange yellow parts of the design.

In testimony whereof I have signed my name to this specification.

FRANCIS WALTER GILLARD.